3,435,070
Patented Mar. 25, 1969

3,435,070
ALKALI METAL-d,l-MALATE MONOHYDRATES
Chao-Shing Cheng, Williamsville, N.Y., assignor to Allied Chemical Corporation, New York, N.Y., a corporation of New York
No Drawing. Filed Jan. 29, 1965, Ser. No. 429,168
Int. Cl. C07f 1/04
U.S. Cl. 260—535                                              3 Claims

ABSTRACT OF THE DISCLOSURE

Production of novel alkali metal-d,l-malate monohydrates by concentration of a dilute aqueous solution of an alkali metal malate, preferably at a temperature of at least 110° C., cooling the resultant solution to below about 30° C., and permitting the desired alkali metal-d,l-malate monohydrate to crystallize. The novel alkali metal-d,l-malate monohydrates of the present invention are stable in humid atmosphere retaining their crystalline and free-flowing character and are useful as buffering agents, particularly as substitutes for sodium citrate in edible compositions.

---

This invention relates to novel salts of d,l-malic acid and to processes for their preparation.

Sodium and potassium malates are known compounds. The hygroscopic character of these salts which was recognized by early investigators makes it difficult to prepare and store these malates in solid form. Recent improvements in the large-scale manufacture of d,l-malic acid have made this product and its derivatives competitive in cost with other edible acids, e.g., citric, adipic, fumaric and lactic acids. Considerable quantities of these acids are utilized in the form of their salts, particularly alkali metal salts, as buffering agents. However, the hygroscopic nature of sodium and potassium malates is a serious deterrent to their utilization in compositions which are prepared, stored and/or used as dry mixtures.

It is therefore a principal object of this invention to devise a non-hygroscopic form of alkali metal d,l-malates.

Another object is to devise a form of sodium malate and potassium malate which is crystalline and free-flowing.

Still another object is to provide an economical process for the preparation of the sodium and potassium d,l-malates in a stable, non-hygroscopic form.

These and other advantages which will be obvious from the following specification are obtained, in accordance with the present invention, by preparing the alkali metal d,l-malates in the form of the monohydrate salts which are stable, non-hygroscopic crystals. By virtue of these unobvious properties the novel monohydrate salts are particularly useful as buffering agents in place of or in combination with sodium citrate and similar compounds in powdered compositions.

The novel sodium and potassium d,l-malate monohydrates are colorless, free-flowing crystalline materials which are non-hygroscopic, i.e., they do not pick up moisture from the atmosphere and thus tend to remain free-flowing even on exposure to humid atmosphere. The empirical composition of these salts corresponds to the formula $$Me_2C_4H_4O_5 \cdot H_2O$$

wherein Me stands for an alkali metal.

The sodium malate monohydrate of this invention is readily prepared by evaporating a dilute aqueous solution of sodium d,l-malate, thereafter cooling the solution to a temperature below about 30° C., to cause the sodium d,l-malate monohydrate to crystallize from the saturated solution. The crystal magma can be separated from the mother liquor in any convenient manner, as by filtration, centrifugation and the like. The solid product can be dried in air or in a moderate temperature (40° to 50° C.) drier. The potassium salt is prepared by a similar procedure.

The solution of sodium d,l-malate can be prepared in any desired manner. A convenient and efficient procedure is to dissolve d,l-malic acid in an equal weight of warm water. The resulting solution is then neutralized by the addition of a suitable alkaline agent, e.g., sodium hydroxide, sodium carbonate, or sodium bicarbonate, preferably to a pH of about 7 to 9.0 and the aqueous mass is heated to remove water. Preferably, the mass is evaporated until its temperature is at least about 110° C. The solution is cooled to about ambient temperature, preferably it is then seeded with a few crystals of sodium d,l-malate monohydrate, and then permitted to stand at ambient temperature to complete crystallization. The crystalline product after separation is preferably washed with a minimum of cold water and then dried in a suitable low temperature drier. The potassium d,l-malate monohydrate, being somewhat more soluble than the analogous sodium salt, is preferably crystallized from solutions which are evaporated to a temperature of at least 120° C.

Additional crops of alkali metal d,l-malate monohydrates can be obtained from the mother liquor by repetition of this process, or the mother liquors can be recycled in a subsequent run of this procedure.

The following examples will illustrate my invention. Parts and percentages are by weight and temperatures are given in degrees centigrade. The malate monohydrates are the d,l-isomers.

EXAMPLE 1

A solution of 268 parts (2 mols) of d,l-malic acid in 268 parts of water was reacted to a pH of about 8.8 by the addition of 92 parts of sodium hydroxide added as a 50% aqueous solution. The resulting aqueous solution of sodium malate was filtered. A 30 part portion of the filtrate was evaporated on a hot plate until the temperature of the residual solution reached 115°. The hot solution was cooled to ambient temperature. The resulting heavy syrup was permitted to stand. After four days, small crystals had appeared in the mass which after six days had grown in size. The crystals were filtered from the mass, washed with a minimum of ice water and dried in air for about 3 days. The crystals of sodium malate monohydrate began to melt at 133° and melted completely, with decomposition at 141°. The water of hydration was determined by titration with Karl Fisher Reagent (method described in "Aquametry" Chap. II page 22, Mitchell & Smith, 1948 ed.—Interscience Publishers) to be 9.09% (theory 9.17%).

EXAMPLE 2

To a solution of 536 parts of d,l-malic acid in 600 parts of water were added 672 parts of solid sodium bicarbonate. The resulting solution was filtered and the filtrate was evaporated to a temperature of 116°. The solution was cooled to about 25° and seeded with about one part of sodium malate monohydrate crystals. The mixture began to crystallize after a few minutes and was permitted to stand for about 3 hours, after which the crystalline slurry was filtered. The filter cake was dried in a 70° oven for about 16 hours. The dried product, sodium malate monohydrate, melted over the range 134° to 143°, with decomposition. Analysis by Karl Fisher Reagent Titration indicated the product to contain 8.91%, 9.2% (two determinations) water.

Two additional crops of crystals were obtained from the mother liquor by reconcentration as above. A total of 775 parts of sodium malate monohydrate, or 98.8% yield was obtained.

EXAMPLE 3

A solution of 26.8 parts of d,l-malic acid in 50 parts of distilled water was reacted with 28 parts of potassium carbonate. The solution was filtered and then evaporated until the temperature of the residual solution was 127°. The mixture was cooled in an ice bath and seeded with a few crystals of potassium malate monohydrate. The mixture was permitted to stand for about 16 hours and then the crystal slurry was filtered. The product was dried in air. The dried product sintered at 107° but did not melt at temperatures up to 250°. Analysis of the product after two recrystallizations and drying in a vacuum oven at 67° for four hours indicated a content of 8.87% $H_2O$ (calculated for $K_2C_4H_4O_5 \cdot H_2O = 7.89\%$).

EXAMPLE 4

The non-hygroscopic character of the novel salts of this invention was illustrated by exposing the salts in a controlled humidity cabinet for one hour and determining the amount of water adsorbed. The non-hydrated salts were similarly exposed for comparison. The results are shown in Table I below.

TABLE I

| Salt | Moisture pickup, percent | Condition after 1 hr., 79% R.H, 28° C. |
|---|---|---|
| Sodium malate | 1.2 | Badly caked. |
| Sodium malate monohydrate | 0.17 | Dry, free-flowing. |
| Potassium malate | 14.6 | Caked. |
| Potassium malate monohydrate | 0.6 | Slightly caked, free-flowing. |

These tests clearly show the non-hygroscopic character of the novel hydrates of alkali metal malate salts which is surprisingly different from the known hygroscopic character of the analogous anhydrous salts. The novel salts thus remain free-flowing on exposure to the atmosphere.

It can thus be seen that an efficient and economical procedure has been provided for the preparation of sodium and potassium malate monohydrates in solid, free-flowing and stable form.

The invention has been illustrated by means of several examples which include the best mode presently known of carrying out my invention. However, it will be obvious that variations in the details disclosed in these purely illustrative examples can be made without departing from the scope or spirit of the invention which is to be limited only by the appended claims.

I claim:
1. Alkali metal-d,l-malate monohydrates of the general formula:

$$Me_2C_4H_4O_5 \cdot H_2O$$

wherein Me is an alkali metal.
2. Sodium d,l-malate monohydrate.
3. Potassium d,l-malate monohydrate.

References Cited

UNITED STATES PATENTS

| | | | |
|---|---|---|---|
| 2,159,155 | 5/1939 | Holton | 260—535 |
| 2,446,981 | 8/1948 | Ninger | 167—55 |

OTHER REFERENCES

Massol: "Annales de Chimie et de Physique," 7th series, vol. I (1894), pp. 209–211.

"Beilsteins Handbuch der Organischen Chemie," vol. III, syst. No. 240 (1921), pp. 425, 436, 440.

LORRAINE A. WEINBERGER, *Primary Examiner.*

A. P. HALLUIN, *Assistant Examiner.*